(12) United States Patent
Sinha (10) Patent No.: US 8,705,050 B2
(45) Date of Patent: Apr. 22, 2014

(54) PROVIDING THERMAL COMPENSATION FOR TOPOGRAPHIC MEASUREMENT AT AN ELEVATED TEMPERATURE USING A NON-CONTACT VIBRATION TRANSDUCER

(75) Inventor: Arvind K. Sinha, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 12/898,783

(22) Filed: Oct. 6, 2010

(65) Prior Publication Data

US 2012/0086952 A1 Apr. 12, 2012

(51) Int. Cl.
*G01B 11/30* (2006.01)

(52) U.S. Cl.
USPC .............. 356/612; 356/237.1; 356/237.5; 356/45

(58) Field of Classification Search
USPC .............. 356/237.1–237.5, 45, 612
See application file for complete search history.

(56) References Cited

U.S. PATENT DOCUMENTS

| | | | |
|---|---|---|---|
| 4,794,264 | A | 12/1988 | Quackenbos et al. |
| 5,708,279 | A | 1/1998 | Cheng |
| 5,917,191 | A | 6/1999 | Cheng |
| 6,791,099 | B2 | 9/2004 | Some et al. |
| 6,909,500 | B2 | 6/2005 | Meeks |
| 7,190,447 | B2 | 3/2007 | Meeks |
| 7,525,659 | B2 | 4/2009 | Furman et al. |
| 7,535,561 | B2 * | 5/2009 | Chikamatsu et al. ...... 356/237.2 |
| 7,576,849 | B2 | 8/2009 | Wagner |
| 7,630,086 | B2 | 12/2009 | Oak et al. |
| 2009/0262339 | A1 | 10/2009 | Suga et al. |

OTHER PUBLICATIONS

Johansmann, Martin et al., "Targeting the Limits of Laser Doppler Vibrometry", All Polytec, 12 pages, Copyright 2005.

* cited by examiner

*Primary Examiner* — Gregory J Toatley
*Assistant Examiner* — Iyabo S Alli
(74) *Attorney, Agent, or Firm* — Matthew J. Bussan

(57) ABSTRACT

A mechanism for providing thermal compensation when measuring surface topography at an elevated temperature using a non-contact vibration transducer, such as a laser Doppler vibrometer (LDV). Thermal compensation is provided to a detector output signal to correct for thermal diffraction of a reflected portion of a beam of radiant energy directed at a surface of a test object. The thermal compensation is based on a calculated deviation between the detector output signal $r_2$ at an elevated temperature and the detector output signal $r_1$ at approximately room temperature. In one embodiment, the thermal compensation mechanism calculates a stationary signal $r_3(t)$ which represents the detector output signal without noise and corrected for thermal diffraction at the elevated temperature according to the following equation:

$$r_3(t) = \lim_{T \to \infty} 1/T \int_{-t/2}^{+t/2} r_2^*(t) * r_2^*(t + \Delta t) \, dt,$$

wherein T represents the total number of spectrums measured at the elevated temperature at multiple times upon which the compensation is based, and wherein $r_2^* = r_2 - r_2(\text{baseline})$.

20 Claims, 4 Drawing Sheets

PROVIDING THERMAL COMPENSATION FOR TOPOGRAPHIC MEASUREMENT AT AN ELEVATED TEMPERATURE USING A NON-CONTACT VIBRATION TRANSDUCER

BACKGROUND OF THE INVENTION

1. Field of Invention

The present invention relates in general to the data processing field. More particularly, the present invention relates to providing thermal compensation when measuring surface topographies at elevated temperatures using a non-contact vibration transducer, such as a laser Doppler vibrometer (LDV).

2. Background Art

Unlike traditional contact vibration transducers, laser-based vibration transducers, or laser vibrometers, require no physical contact with a test object (also referred to as a "target"). Typical examples of applications where a laser-based vibration transducer is the preferred choice include remote, mass-loading-free vibration measurements on targets that are difficult or impossible to access. Laser vibrometers are often used for hard disk drive dynamic testing, as well as measuring the surface topographies of hard disk platters, semiconductor wafers, microelectronic chips, and other high-precision test objects.

The laser source used in a laser vibrometer is typically either a HeNe gas laser emitting visible red light or a solid state laser diode emitting infrared light. In both cases, the emitted energy level is low, ensuring a safe instrument that, depending on the type, can be operated with no or minimal safety precautions.

The ability to incorporate advanced, miniaturized optical mirror systems together with the laser source provides the capability to make automated scanning measurements, where a high number of measurement points can be measured consecutively. Non-contact vibration measurements with very high spatial resolution are possible with such a scanning system and can lead to significant improvements in the accuracy and precision of experimental model models. For example, natural frequencies and mode shapes may be extracted from these non-contact vibration measurements, and modal parameters (e.g., modal mass, stiffness and damping) calculated.

The measurement principle used by laser vibrometers is based upon the Doppler effect. When monochromatic laser light is scattered back from a vibrating target, it undergoes a frequency shift proportional to the velocity of the target. This is known as the Doppler effect. As the target moves towards the light source, the back-scattered light undergoes an increase in frequency. On the other hand, as the target moves away from the light source, the back-scattered light undergoes a lowering of the frequency. If the target is vibrating, the frequency of the back-scattered beam will be frequency modulated at the so-called Doppler frequency. The Doppler frequency is directly proportional to the velocity of the target. Therefore, tracking this Doppler frequency provides direct measurement of the velocity of the target relative to the light source. The Doppler effect can be utilized in systems measuring translational (linear) vibration as well as systems measuring torsional (angular) vibration.

A laser Doppler vibrometer (LDV) utilizes the Doppler effect to measure real time microstructural response and surface topography of a test object. This measurement is usually performed at room temperature (RT). However, it may be desirable or necessary to perform this measurement at an elevated temperature. For example, it may be desirable to perform a topographic measurement of a microelectronic chip at an elevated temperature during its manufacture or at its operating temperature. Increasing the temperature at which such topographic measurements are performed causes the back-scattered light in the laser vibrometer to diffract, resulting in erroneous response of the baseline pulse.

It is known that a normalization operation may be utilized to make measurements provided by a laser vibrometer less sensitive to environmental factors. For example, U.S. Pat. No. 5,917,191, entitled "APPARATUS FOR MEASURING SURFACE TOPOGRAPHY", issued Jun. 29, 1999 to David Cheng, discloses a laser vibrometer that uses the output of a summing amplifier to normalize the output of a differential amplifier. More particularly, the output of the differential amplifier is divided by the output of the summing amplifier. Each amplifier is electrically connected to two abutting photoconductors of a beam detector. This normalization operation is performed to make measurements provided by the photodetectors insensitive to beam intensity, to changes in the reflectivity of the test object, to signal drift, and to environmental factors. However, normalization schemes such as the normalization operation disclosed in the Cheng patent do not compensate for thermal diffraction of the back-scattered light at elevated temperatures in the laser vibrometer.

Therefore, a need exists for a mechanism for providing thermal compensation when measuring surface topography at an elevated temperature using a non-contact vibration transducer, such as a laser Doppler vibrometer.

SUMMARY OF THE INVENTION

According to the preferred embodiments of the present invention, a thermal compensation mechanism provides thermal compensation when measuring surface topography at an elevated temperature using a non-contact vibration transducer, such as a laser Doppler vibrometer (LDV). Thermal compensation is provided to a detector output signal to correct for thermal diffraction of a reflected portion of a beam of radiant energy directed at a surface of a test object. The thermal compensation is based on a calculated deviation between the detector output signal $r_2$ at an elevated temperature and the detector output signal $r_1$ at approximately room temperature. In one embodiment, the thermal compensation mechanism calculates a stationary signal $r_3(t)$ which represents the detector output signal without noise and corrected for thermal diffraction at the elevated temperature according to the following equation:

$$r_3(t) = \lim_{T \to \infty} 1/T \int_{-t/2}^{+t/2} r_2^*(t) * r_2^*(t + \Delta t) \, dt,$$

wherein T represents the total number of spectrums measured at the elevated temperature at multiple times upon which the compensation is based, and wherein $r_2^* = r_2 - r_2(\text{baseline})$.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1. Overview

In accordance with the preferred embodiments of the present invention, a thermal compensation mechanism provides thermal compensation when measuring surface topography at an elevated temperature using a non-contact vibration transducer, such as a laser Doppler vibrometer (LDV). Thermal compensation is provided to a detector output signal to correct for thermal diffraction of a reflected portion of a beam of radiant energy directed at a surface of a test object. The thermal compensation is based on a calculated deviation between the detector output signal $r_2$ at an elevated temperature and the detector output signal $r_1$ at approximately room temperature. In one embodiment, the thermal compensation mechanism calculates a stationary signal $r_3(t)$ which represents the detector output signal without noise and corrected for thermal diffraction at the elevated temperature according to the following equation:

$$r_3(t) = \lim_{T \to \infty} 1/T \int_{-t/2}^{+t/2} r_2^*(t) * r_2^*(t + \Delta t) dt,$$

wherein T represents the total number of spectrums measured at the elevated temperature at multiple times upon which the compensation is based, and wherein $r_2^* = r_2 - r_2(\text{baseline})$.

2. Detailed Description

Figure 1:
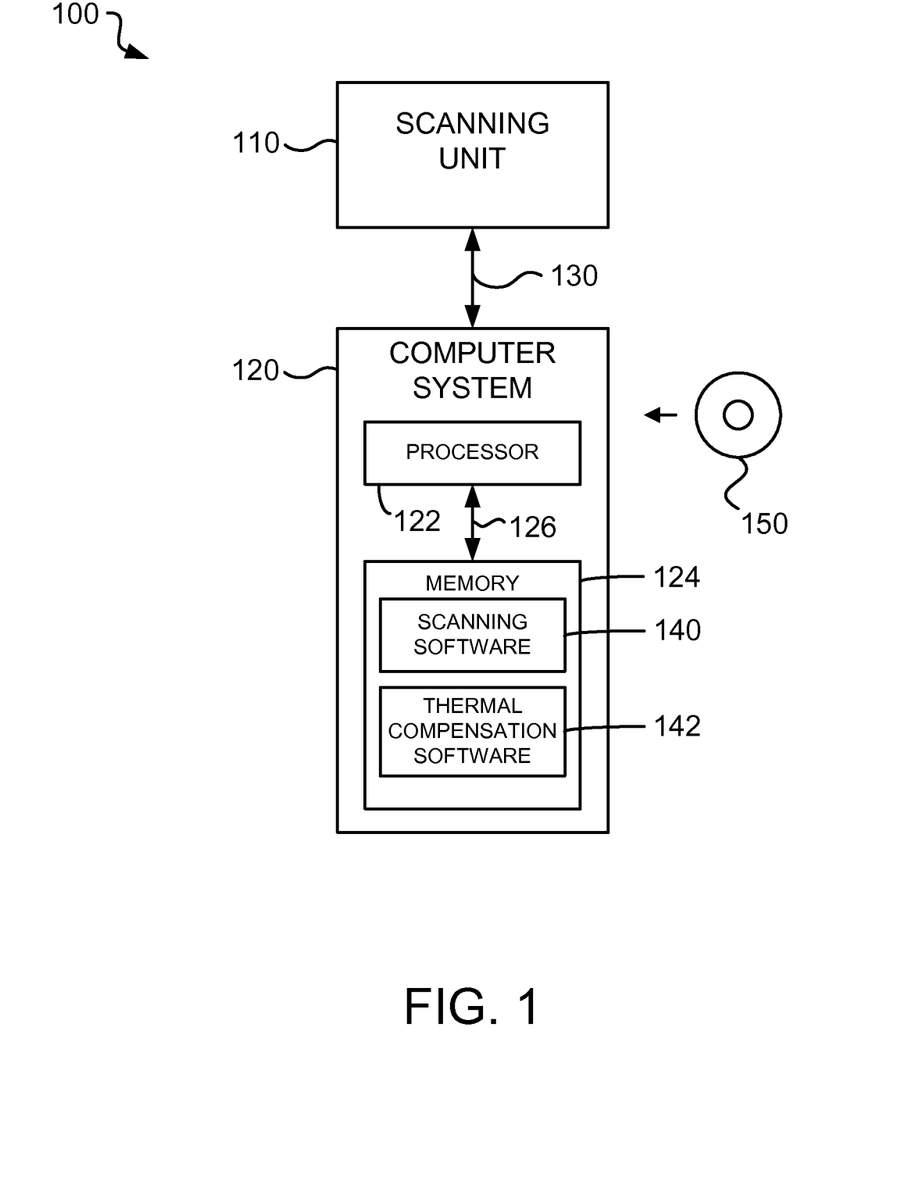
FIG. 1 is a block diagram illustrating an apparatus provided with a thermal compensation mechanism for measuring surface topography at elevated temperatures in accordance with the preferred embodiments of the present invention.

FIG. 1 is a block diagram illustrating an apparatus 100 provided with a thermal compensation mechanism for measuring surface topography at elevated temperatures in accordance with the preferred embodiments of the present invention. The surface topography measuring apparatus 100 includes a scanning unit 110 and a data processing unit, such as a computer system 120. Preferably, as illustrated in FIG. 1, the scanning unit 110 and the data processing unit are provided as separate entities. However, those skilled in the art will appreciate that the data processing unit and the scanning unit may be integrated into a single entity.

The scanning unit 110, an example of which is described in more detail below with reference to FIG. 2, typically includes an enclosure (e.g., 201 shown in FIG. 2) having an access or opening (not shown), as well as a rotatable pedestal (e.g., 202 shown in FIG. 2) accessible through the opening. A test object, such as a semiconductor wafer (e.g., 204 shown in FIG. 2), rests on the pedestal. While the present invention will be discussed in terms of measuring the surface topography of a semiconductor wafer, it should be understood that this invention can be used to non-destructively measure the surface topography of a variety of test objects, including hard disk platters, semiconductor wafers, microelectronic chips, optical blanks, etc. As used herein, "topography" refers to any description of a surface of a test object, such as curvature, contours, etc.

The computer system 120 is largely conventional except that it includes thermal compensation software 142 that (preferably, working in conjunction with conventional scanning software 140) performs the functions as further described below with reference to FIG. 4. For example, the computer system 120 may be a PC. However, those skilled in the art will appreciate that the method, apparatus, and computer program product of the present invention apply equally to any computer system, regardless of whether the computer system is a complicated multi-user computing apparatus, a PC, or an embedded control system. As shown in FIG. 1, the computer system 120 comprises one or more processors 122 and a main memory 124. These system components, as well as other conventional system components such as a hard disk drive, CD-ROM drive, and a network interface (not shown), are interconnected through a system bus 126.

A data bus 130 couples the scanning unit 110 to the computer system 120. Preferably, the computer system 120 has an appropriate I/O card with A/D converters plugged into one of its expansion slots such that analog data produced by the scanning unit 110 on the bus 130 can be converted into digital data for the computer system 120. Alternatively, the scanning unit 110 can provide digital data on the bus 130, which can enter the computer system through an existing digital I/O port such as an RS-232C serial port or USB port. Appropriate control busses may also connect the computer system 120 to the scanning unit 110 in a manner well known in the art.

Figure 2:
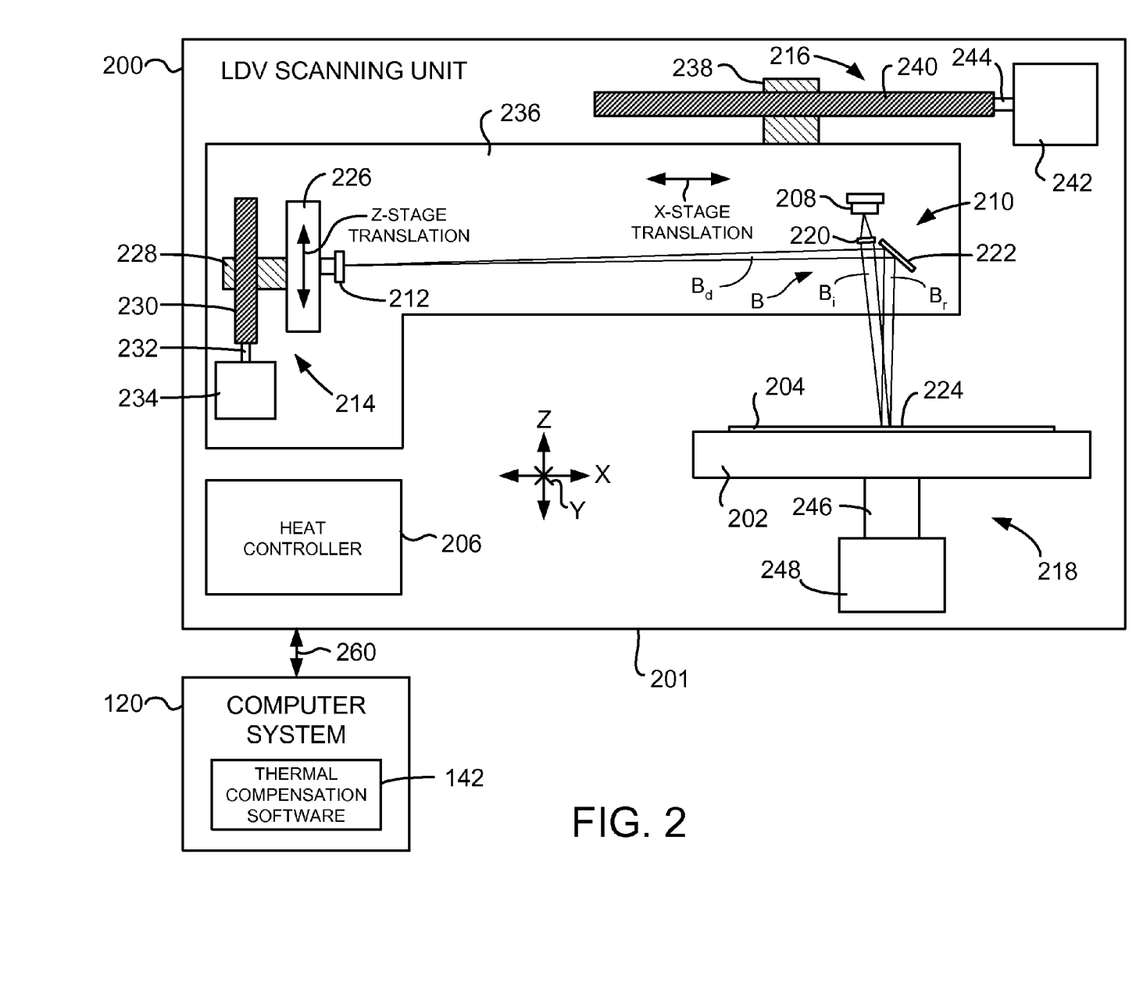
FIG. 2 is a block diagram illustrating an exemplary laser Doppler vibrometer (LDV) scanning unit suitable for use as the scanning unit of FIG. 1.

Any such connections (e.g., a data bus, control busses, etc.) between the scanning unit 110 and the computer system 120 are more generally referred to herein as a "network connection" (e.g., 260 shown in FIG. 2).

In the embodiment illustrated in FIG. 1, the scanning software 140 and the thermal compensation software 142 reside in the main memory 124. In accordance with the preferred embodiments of the present invention, the thermal compensation software 142 (preferably, working in conjunction with conventional scanning software 140) performs the functions as further described below with reference to FIG. 4. The scanning software 140 may be, for example, the software described in U.S. Pat. No. 5,917,191, entitled "APPARATUS FOR MEASURING SURFACE TOPOGRAPHY", issued Jun. 29, 1999 to David Cheng, which is incorporated herein by reference in its entirety. In this case, the thermal compensation software 142 can be sold as an add-on piece to existing hardware and software. Alternatively, conventional scanning software, itself, may be modified to perform the functions as further described below with reference to FIG. 4. In this alternative case, the so-modified scanning software can be sold as an integral part of a new apparatus or as a software upgrade to work with existing hardware.

At this point, it is important to note that while the description above is in the context of a fully functional computer system, those skilled in the art will appreciate that the thermal compensation software 142, as well as other software entities described herein (e.g., the scanning software 140) may be distributed as an article of manufacture (also referred to herein as a "computer program product") in a variety of forms, and the claims extend to all suitable types of computer-readable media used to actually carry out the distribution, including recordable type media such as floppy disks, CD-RWs, CD-ROMs (e.g., CD-ROM 150 in FIG. 1) and DVD-ROMs.

FIG. 2 is a block diagram illustrating an exemplary laser Doppler vibrometer (LDV) scanning unit 200 suitable for use as the scanning unit 110 of FIG. 1. Those skilled in the art will appreciate, however, that any suitable conventional LDV scanning unit may be used in lieu the exemplary LDV scanning unit 200 shown in FIG. 2. The LDV scanning unit 200 shown in FIG. 2 is based on a scanning unit described in the Cheng patent, though modified to incorporate a conventional heat controller 206.

The particular configuration of the optical signal pathway illustrated in FIG. 2 is exemplary and for purposes of illustrating the preferred embodiments of the present invention and, hence, the particular configuration illustrated therein is not limiting.

The LDV scanning unit 200 includes a light source, such as a diode laser 208, a beam directing assembly 210, a detector 212, a z-stage assembly 214, an x-stage assembly 216, and a pedestal assembly 218 including the aforementioned pedestal 202.

The light source used in the scanning unit may be any suitable conventional source capable of developing a beam of radiant energy. Examples of suitable conventional sources include the laser sources typically used in a laser vibrometer, i.e., either a HeNe gas laser emitting visible red light or a solid state laser diode emitting infrared light. In both cases, the emitted energy level is low, ensuring a safe instrument that, depending on the type, can be operated with no or minimal safety precautions. Diode laser 208 preferably operates at a wavelength of approximately 780 nm. A typical maximum power output of the diode laser 208 is less than 2 mW.

The beam directing assembly 210 includes a converging lens 220 and a front silvered minor 222. The converging lens 220 typically has a focal length which allows the beam B produced by the diode laser 208 to form a beam spot on a surface 224 of the wafer 204 of about 3 mm in diameter and a beam spot on the detector 212 which is approximately 20-50 μm in diameter. The diode laser 208 forms an incident beam $B_i$ which impinges upon the surface 224 of the wafer 204. The surface 224 of the wafer 204 reflects a portion of the incident beam $B_i$ as a reflected beam $B_r$. The reflected beam Br impinges upon the reflective surface of the mirror 222 and is reflected towards the detector 212 as a directed beam $B_d$. Therefore, beam B comprises the sum of beams $B_i$, $B_r$, and $B_d$. The effective reflected beam path length comprising beam $B_r$ and $B_d$ is about 300 mm.

The detector 212 may be any suitable conventional detector. An example of a suitable detector is the beam detector beam detector disclosed in the Chen patent, which has two abutting photodetectors each electrically connected to a differential amplifier and a summing amplifier. However, those skilled in the art will appreciate that any number of other conventional detectors are suitable as well. The detector 212 is responsive to the position along a z-axis of the beam spot developed by the beam Bd and is operative to produce an electrical signal representative of the z-position. The z-stage assembly 214 includes a z-stage 226 including a nut 228 engaged with a lead screw 230. The lead screw 230 is driven by a shaft 232 of a stepper motor 234. Rotation of the shaft 232 causes the z-stage 226 and, therefore, the detector 212 to translate upwardly or downwardly in a direction parallel to the z-axis. The stepper motor 234 has the characteristic that it can be operated to move z-stage 226 in discrete, reproducible increments. In practice, such increments result in advancing or retracting the z-stage in the z-direction in increments of about 0.6 microns.

The x-stage assembly 216 includes an x-stage 236 which supports the diode laser 208, the beam directing assembly 210, the detector 212, and the z-stage assembly 214. The x-stage assembly 216 also includes a nut 238 coupled to the x-stage 236, a lead screw 240 engaged with the nut 238, and a stepper motor 242 having a shaft 244 coupled to the lead screw 240. Again, the lead screw 240 and the stepper motor 242 are conventional and permit the x-stage 236 to be moved incrementally along the x-axis. In practice, such increments result in advancing or retracting the x-stage 236 in incremental distances of about 0.025 mm.

The pedestal assembly 218 includes the aforementioned pedestal 202, which is preferably disk shaped and has a diameter somewhat larger than the diameter of the wafer 204 (or other test object) that it is intended to support. The pedestal 202 is, itself, supported by a drive reduction mechanism 246 coupled to the shaft of a stepper motor 248. The stepper motor 248 is operative to rotate the pedestal 202 and the wafer 204 around an axis parallel to the z-axis. In other words, the wafer 204 is caused to rotate parallel to or in the x/y-plane, where the y-axis extends perpendicularly to the plane of the paper. The incremental angle θ of rotation of the pedestal 202 is preferably given by the equation:

$$\theta = 360°/N_s \quad \text{(Equation 1)}$$

where $N_s$ is the number of scans across the upper surface 224 of the wafer 204. The rotational resolution of the stage is typically in the range of 0.1 to 0.01 degrees.

The heat controller 206, which is conventional, operates to control the temperature of the test object within the LDV scanning unit 200. For example, the heat controller 206 may activate/deactivate one or more heating elements (not shown) located in the LDV scanning unit 200 to heat the test object to an elevated temperature and then maintain the test object at the elevated temperature. Preferably, the heat controller 206 receives periodic updates of the current temperature of the test object from a temperature sensor (not shown). The heating elements may be, for example, resistive heating elements embedded in the pedestal 202, along with the temperature sensor. The heat controller 206 applies an electrical current to the resistive heating elements to heat the test object to the elevated temperature and then maintain the test object at the elevated temperature.

The heat controller 206 may also activate/deactivate one or more cooling elements (not shown) located in the LDV scanning unit 200 to quickly return the test object to room temperature (i.e., subsequent to the test object having been heated to and maintained at the elevated temperature). Here too, the heat controller 206 preferably receives periodic updates of the current temperature of the test object from the temperature sensor. The cooling elements may be, for example, cooling tubes embedded in the pedestal 202, along with the temperature sensor. The heat controller 206 causes a cooling fluid to flow through the cooling tubes to cool the test object to room temperature.

Temperature information (e.g., the elevated temperature, the room temperature, the current temperature, etc.) may be transferred between the heat controller 206 in the LDV scanning unit 200 and the computer system 201 using one or more control busses in a manner well known in the art.

As is conventional, the LDV scanning unit 200 typically includes hardware, software and firmware that are not illustrated in FIG. 2 to communicate with and control internal components, and to provide network connectivity capabilities for the LDV scanning unit 200 to connect with the computer system 120 and other digital computing devices. Such hardware, software and firmware may include one or more network interfaces, one or more processors, and memory.

The networking mechanism used to connect the LDV scanning unit 200 to the computer system 120 typically depends on the network connectivity capabilities of the LDV scanning unit 200. For example, the network connection 260 may be a USB cable, a wireless connection, or an Internet connection.

The present invention applies equally no matter how the computer system 120 may be connected to the LDV scanning unit 200, regardless of whether the network connection 260 is made using present-day analog and/or digital techniques or via some networking mechanism of the future. In addition, many different network protocols can be used to implement network 260. These protocols are specialized computer programs that allow computers to communicate across network 260. TCP/IP (Transmission Control Protocol/Internet Protocol) is an example of a suitable network protocol.

Figure 3:
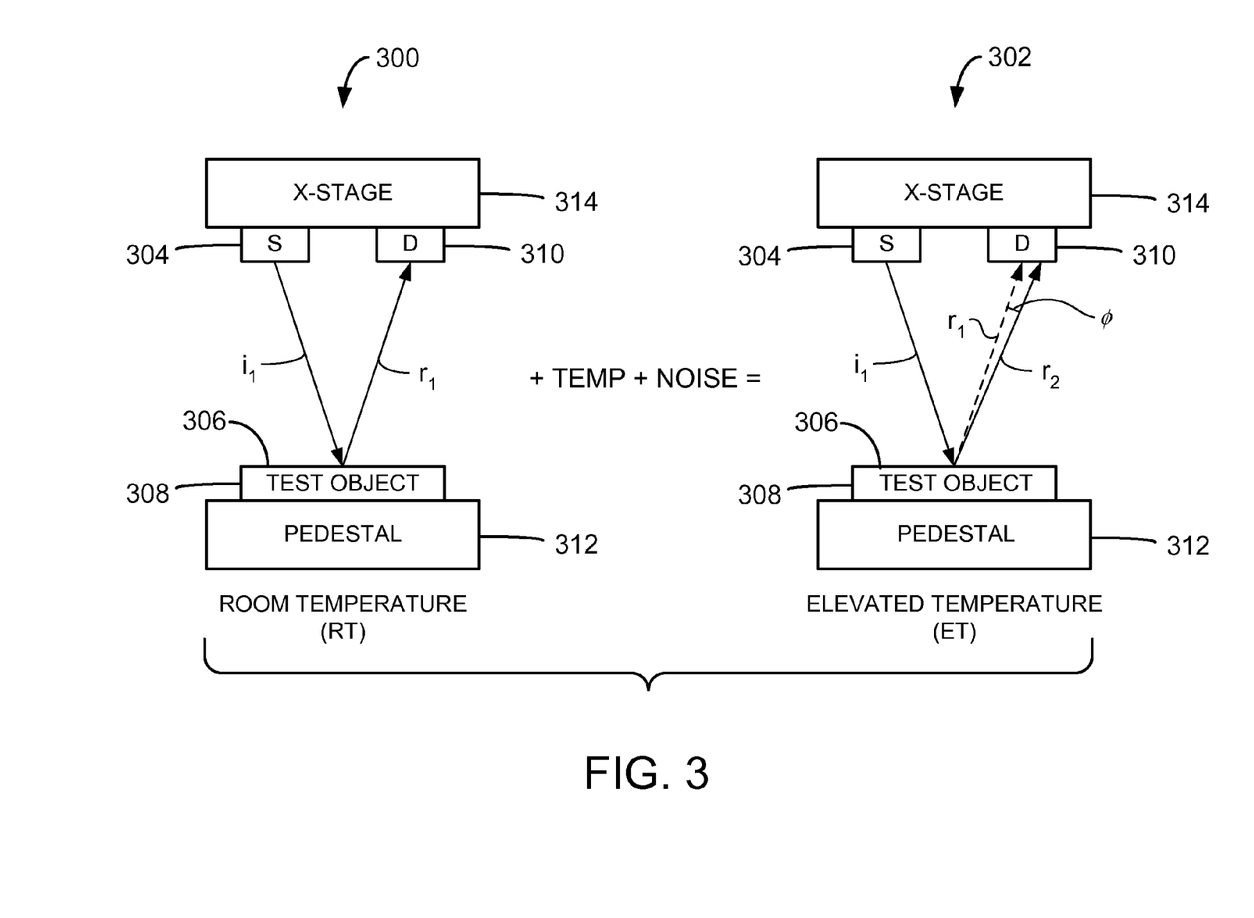
FIG. 3 is a block diagram illustrating a representation of the thermal diffraction of the back-scattered light that occurs at elevated temperature in the scanning unit of FIG. 1.

FIG. 3 is a block diagram illustrating a representation of the thermal diffraction of the back-scattered light that occurs at elevated temperature in the scanning unit of FIG. 1. The left side of FIG. 3 (denoted by optical signal path 300) shows the back-scattering of light at room temperature (RT), while the right side of FIG. 3 (denoted by optical signal path 302) shows back-scattering of light at an elevated temperature (ET). The optical signal paths illustrated in FIG. 3 are simplified for purposes of illustration (e.g., certain elements typically present in the optical signal path are omitted in FIG. 3 so as not to obscure the invention—these elements include a converging lens, a front silvered mirror, and a z-stage assembly). In general, however, the elements of the light signal paths illustrated in FIG. 3 correspond to like-named elements in the LDV scanning unit 200 of FIG. 2.

As illustrated in FIG. 3, the optical signal path 302 is subject to a temperature difference with respect to the optical signal path 300 (i.e., the ET vs. RT), as well as noise (e.g., vibration, noise from the surrounding environment, etc.).

In optical signal path 300 at room temperature (RT), the light source 304 forms an incident beam $i_1$ which impinges upon a surface 306 of a test object 308. The surface 306 of the test object 308 reflects a portion of the incident beam $i_1$ as a reflected beam $r_1$. The reflected beam $r_1$ is reflected toward a beam detector 310. The test object 308 rests on a pedestal 312. The source 304 and the detector 310 are illustrated in the simplified block diagram of FIG. 3 as mounted on an x-stage 314 (in practice, however, the detector 310 is typically mounted on a z-stage of a z-stage assembly).

In optical signal path 302 at the elevated temperature (ET), the light source 304 forms an incident beam $i_1$ which impinges upon a surface 306 of a test object 308. The surface 306 of the test object 308 reflects a portion of the incident beam $i_1$ as a reflected beam $r_2$. The reflected beam $r_2$ is reflected toward a beam detector 310. The reflected beam $r_2$ at the ET is diffracted at an angle $\phi_t$ with respect to the reflected beam $r_1$ at RT. As mentioned above in the Background Art section, increasing the temperature at which topographic measurements are performed causes the back-scattered light to diffract, resulting in erroneous response of the baseline pulse.

The deviation between the detector output signal $r_2$ at the elevated temperature (ET) and the detector output signal $r_1$ at approximately room temperature (RT) is preferably given by the equation:

$$\text{Deviation} = r_2 - r_1 \qquad \text{(Equation 2)}$$

The detector output signal $r_2$ at the elevated temperature (ET) can be broken apart into two components, i.e., a baseline component $r_2$(baseline) and a component $r_2^*$ according to the following equation:

$$r_2^* = r_2 - r_2(\text{baseline}) \qquad \text{(Equation 3)}$$

The value for Deviation calculated using Equation 2 may be substituted into Equation 3 as the value for $r_2$(baseline) to, thereby, obtain the value for $r_2^*$.

A signal $r_3(t)$ which represents the detector output signal without noise and corrected for thermal diffraction may be obtained according to the following equation:

$$r_3(t) = r_2^*(t) * r_2^*(t+\Delta t) \qquad \text{(Equation 4)}$$

where the component $r_2^*(t)$ is from a spectrum measured at time t and the component $r_2^*(t+\Delta t)$ is from a spectrum measured at time (t+$\Delta$t).

For a stationary signal, $r_3(t)$ may be calculated according to the following equation:

$$r_3(t) = \lim_{T \to \infty} 1/T \int_{-t/2}^{+t/2} r_2^*(t) * r_2^*(t+\Delta t) dt \qquad \text{(Equation 5)}$$

where T represents the total number of spectrums measured at the elevated temperature upon which the compensation is based. Each spectrum is measured at a different time. Fourier transform and other forms of spectrum analysis may be used to extract the unbiased spectrum to filter out temperature and noise effects. Those skilled in the art will appreciate that $r_3(t)$ may also be calculated as a summation in discrete form.

Experimental results obtained by applying the mechanism for providing thermal compensation according to the present invention are shown in the table below.

TABLE 1

| Temperature, (C.) | Baseline (22 C.), (Degrees) | At Temperature, (Degrees) | Deviation after correction, (%) |
|---|---|---|---|
| 45 | 0 | 0.0152 | 0.02 |
| 65 | 0 | 0.0204 | 0.05 |
| 85 | 0 | 0.0231 | 1.04 |

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM) (e.g., memory 124 in FIG. 1), a read-only memory (ROM), an erasable programmable read-only memory (EPROM or Flash memory), an optical fiber, a portable compact disc read-only memory (CD-ROM) (e.g., CD-ROM 150 in FIG. 1), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (e.g., processor 122 of computer system 120 in FIG. 1), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
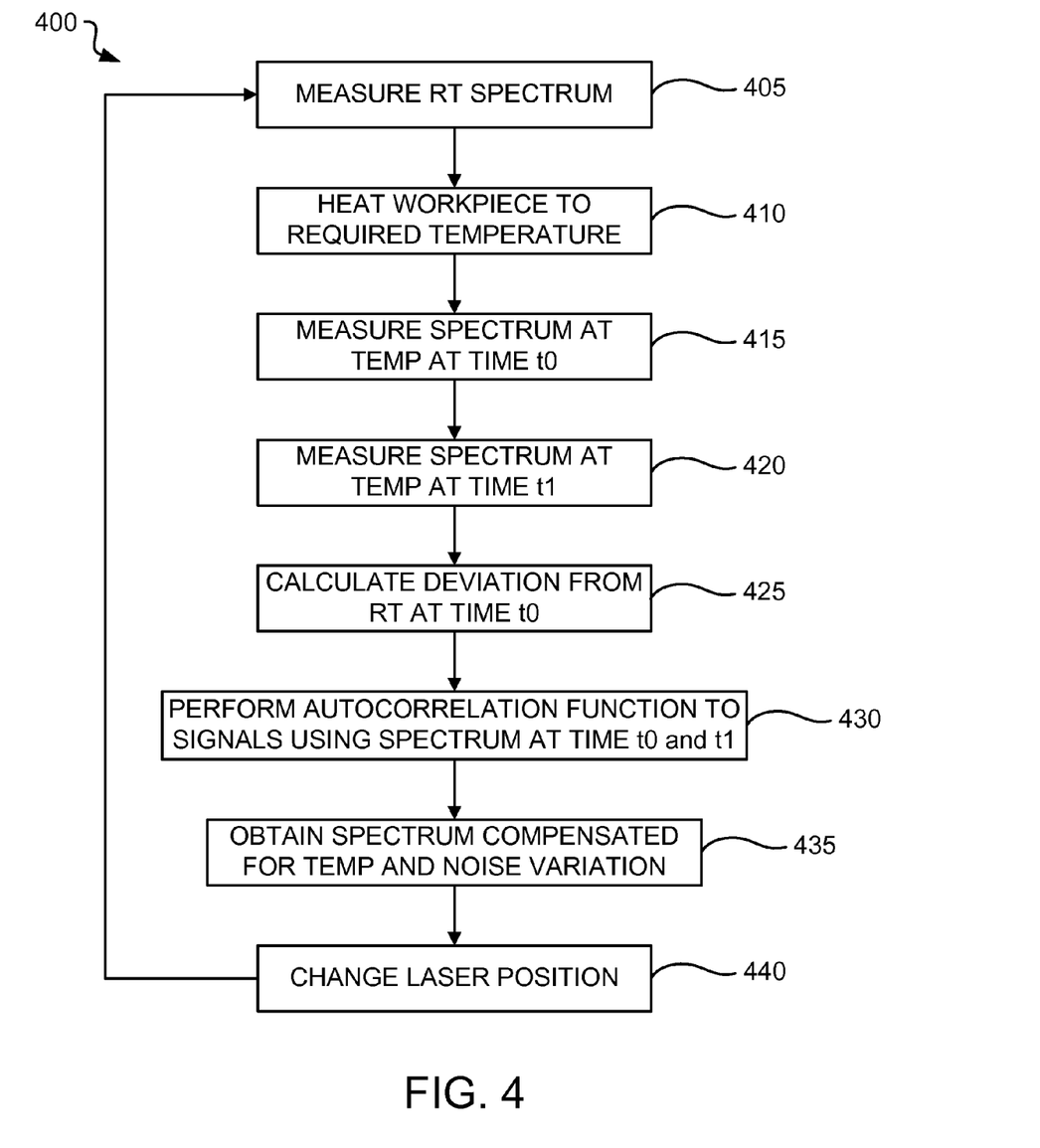
FIG. 4 is a flow diagram illustrating a method of providing thermal compensation when measuring surface topography at an elevated temperature using a non-contact vibration transducer in accordance with the preferred embodiments of the present invention.

FIG. 4 is a flow diagram illustrating a method of providing thermal compensation when measuring surface topography at an elevated temperature using a non-contact vibration transducer in accordance with the preferred embodiments of the present invention. In the method 400, the steps discussed below (steps 405-440) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The method 400 begins by measuring a spectrum comprising a detector output signal $r_1$ resulting from a reflected portion of a laser beam directed at a surface of a test object at approximately room temperature (step 405). This measurement corresponds to that made with respect to the optical signal path 300 at room temperature (RT) in FIG. 3.

Next, the method 400 continues by heating the test object to an elevated temperature (step 410). This step may be performed, for example, under the control of a heat controller (e.g., 206 shown in FIG. 2).

The method 400 then continues by measuring a spectrum comprising a detector output signal $r_2$ resulting from the reflected portion of the laser beam directed at the surface of the test object at the elevated temperature at a time $t_0$ (step 415). Subsequently, the method continues by again measuring a spectrum comprising a detector output signal $r_2$ resulting from the reflected portion of the beam laser directed at the surface of the test object at the elevated temperature at a time $t_1$ (step 420). These measurements correspond to that made with respect to the optical signal path 302 at the elevated temperature (ET) in FIG. 3.

Also, a deviation is calculated as a difference between the detector output signal $r_2$ at the elevated temperature at time $t_0$ and the detector output signal $r_1$ at approximately room temperature (step 425). This calculation corresponds to Equation 2, above.

The method 400 continues by performing an autocorrelation function using the spectrum comprising the detector output signal $r_2$ measured at the elevated temperature at times $t_0$ and $t_1$ (step 430). Preferably, the autocorrelation function uses signal processing (i.e., Fourier transform or some other form of spectrum analysis) to extract the unbiased spectrum to filter out temperature and noise effects. This requires constant monitoring of the spectrum coming out of the sample surface.

The method 400 continues by obtaining a stationary signal $r_3(t)$ compensated for temperature and noise variation (step 435). The stationary signal $r_3(t)$ may be obtained, for example, according to Equation 5, above.

The laser position is then changed (step 440), and the method 400 then returns to step 405. The steps 405-435 are repeated for each new laser position.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. An apparatus for providing thermal compensation when measuring surface topography at an elevated temperature, comprising:
    a pedestal for receiving a test object having a surface to be measured;
    a source capable of developing a beam of radiant energy directed at the surface of the test object;
    a detector positioned to detect a reflected portion of the beam, the detector capable of developing an output signal based on the reflected portion of the beam;
    a thermal compensation mechanism capable of providing thermal compensation to the detector output signal to correct for thermal diffraction of the reflected portion of the beam, wherein the thermal compensation is based on a deviation calculated as a difference between the detector output signal $r_2$ at an elevated temperature and the detector output signal $r_1$ at approximately room temperature.

2. The apparatus as recited in claim 1, wherein the thermal compensation mechanism calculates a stationary signal $r_3(t)$ which represents the detector output signal without noise and corrected for thermal diffraction at the elevated temperature according to the following equation:

$$r_3(t) = \lim_{T \to \infty} 1/T \int_{-t/2}^{+t/2} r_2^*(t) * r_2^*(t + \Delta t) \, dt,$$

wherein T represents the total number of spectrums measured at the elevated temperature at multiple times upon which the compensation is based, and wherein $r_2^* = r_2 - r_2(\text{baseline})$.

3. The apparatus as recited in claim 1, further comprising a scanning mechanism capable of creating a relative motion between the beam and the surface of the test object such that the beam is scanned in a direction over at least a portion of the surface of the test object, and such that the relative motion stops at each of a plurality of positions along the scanned direction.

4. The apparatus as recited in claim 3, wherein the thermal compensation mechanism calculates, for each of the plurality of positions, a stationary signal $r_3(t)$ which represents the detector output signal without noise and corrected for thermal diffraction at the elevated temperature according to the following equation:

$$r_3(t) = \lim_{T \to \infty} 1/T \int_{-t/2}^{+t/2} r_2^*(t) * r_2^*(t + \Delta t) \, dt,$$

wherein T represents the total number of spectrums measured at the elevated temperature at multiple times upon which the compensation is based, and wherein $r_2^* = r_2 - r_2(\text{baseline})$.

5. The apparatus as recited in claim 4, further comprising a computer system in which the thermal composition mechanism resides, and wherein the computer system is operative to develop topographical data for the surface of the test object based on the stationary signal, for each of the plurality of positions, calculated by the thermal compensation mechanism.

6. The apparatus as recited in claim 4, wherein the test object is a microelectronic chip.

7. A method of providing thermal compensation when measuring surface topography at an elevated temperature, comprising the steps of:
    measuring a spectrum comprising a detector output signal $r_1$ resulting from a reflected portion of a beam of radiant energy directed at a surface of a test object at approximately room temperature;
    heating the test object to an elevated temperature;
    measuring a spectrum comprising a detector output signal $r_2$ resulting from the reflected portion of the beam directed at the surface of the test object at the elevated temperature at a time $t_0$;
    measuring a spectrum comprising a detector output signal $r_2$ resulting from the reflected portion of the beam directed at the surface of the test object at the elevated temperature at a time $t_1$;
    calculating a deviation as a difference between the detector output signal $r_1$ at approximately room temperature and the detector output signal $r_2$ at the elevated temperature at time $t_0$.

8. The method as recited in claim 7, further comprising the steps of:
    performing an autocorrelation function using the spectrum comprising the detector output signal $r_2$ measured at the elevated temperature at times $t_0$ and $t_1$;
    obtaining a stationary signal $r_3(t)$ compensated for temperature and noise variation.

9. The method as recited in claim 8, wherein the stationary signal $r_3(t)$ is obtained according to the following equation:

$$r_3(t) = \lim_{T \to \infty} 1/T \int_{-t/2}^{+t/2} r_2^*(t) * r_2^*(t + \Delta t) \, dt,$$

wherein T represents the total number of spectrums measured at the elevated temperature at multiple times upon which the compensation is based, and wherein $r_2^* = r_2 - r_2(\text{baseline})$.

10. The method as recited in claim 9, further comprising the step of:
    creating a relative motion between the beam and the surface of the test object such that the beam is scanned in a direction over at least a portion of the surface of the test object, and such that the relative motion stops at each of a plurality of positions along the scanned direction.

11. The method as recited in claim 10, wherein the stationary signal $r_3(t)$ is obtained, for each of the plurality of positions, according to the following equation:

$$r_3(t) = \lim_{T\to\infty} 1/T \int_{-t/2}^{+t/2} r_2^*(t) * r_2^*(t+\Delta t)\,dt,$$

wherein T represents the total number of spectrums measured at the elevated temperature at multiple times upon which the compensation is based, and wherein $r_2^* = r_2 - r_2(\text{baseline})$.

12. The method as recited in claim 11, further comprising the step of:
developing topographical data for the surface of the test object based on the stationary signal obtained for each of the plurality of positions.

13. The method as recited in claim 11, wherein the test object is a microelectronic chip.

14. A computer program product for providing thermal compensation when measuring surface topography at an elevated temperature, the computer program product comprising:
a computer readable storage medium having computer readable program code embodied therewith, the computer readable program code when executed by a processor in a digital computing device causes the digital computing device and/or a scanning unit to perform the steps of:
measuring a spectrum comprising a detector output signal $r_1$ resulting from a reflected portion of a beam of radiant energy directed at a surface of a test object at approximately room temperature;
heating the test object to an elevated temperature;
measuring a spectrum comprising a detector output signal $r_2$ resulting from the reflected portion of the beam directed at the surface of the test object at the elevated temperature at a time $t_0$;
measuring a spectrum comprising a detector output signal $r_2$ resulting from the reflected portion of the beam directed at the surface of the test object at the elevated temperature at a time $t_1$;
calculating a deviation as a difference between the detector output signal $r_1$ at approximately room temperature and the detector output signal $r_2$ at the elevated temperature at time $t_0$.

15. The computer program product as recited in claim 14, the computer readable program code when executed by a processor in the digital computing device causes the digital computing device and/or the scanning unit to further perform the steps of:
performing an autocorrelation function using the spectrum comprising the detector output signal $r_2$ measured at the elevated temperature at times $t_0$ and $t_1$;
obtaining a stationary signal $r_3(t)$ compensated for temperature and noise variation.

16. The computer program product as recited in claim 15, wherein the stationary signal $r_3(t)$ is obtained according to the following equation:

$$r_3(t) = \lim_{T\to\infty} 1/T \int_{-t/2}^{+t/2} r_2^*(t) * r_2^*(t+\Delta t)\,dt,$$

wherein T represents the total number of spectrums measured at the elevated temperature at multiple times upon which the compensation is based, and wherein $r_2^* = r_2 - r_2(\text{baseline})$.

17. The computer program product as recited in claim 15, the computer readable program code when executed by a processor in the digital computing device causes the digital computing device and/or the scanning unit to further perform the step of:
creating a relative motion between the beam and the surface of the test object such that the beam is scanned in a direction over at least a portion of the surface of the test object, and such that the relative motion stops at each of a plurality of positions along the scanned direction.

18. The computer program product as recited in claim 17, wherein the stationary signal $r_3(t)$ is obtained, for each of the plurality of positions, according to the following equation:

$$r_3(t) = \lim_{T\to\infty} 1/T \int_{-t/2}^{+t/2} r_2^*(t) * r_2^*(t+\Delta t)\,dt,$$

wherein T represents the total number of spectrums measured at the elevated temperature at multiple times upon which the compensation is based, and wherein $r_2^* = r_2 - r_2(\text{baseline})$.

19. The computer program product as recited in claim 18, the computer readable program code when executed by a processor in the digital computing device causes the digital computing device and/or the scanning unit to further perform the step of:
developing topographical data for the surface of the test object based on the stationary signal obtained for each of the plurality of positions.

20. The computer program product as recited in claim 18, wherein the test object is a microelectronic chip.

* * * * *